United States Patent [19]

Miyake et al.

[11] Patent Number: 4,647,502

[45] Date of Patent: Mar. 3, 1987

[54] MAGNETIC RECORDING MEDIUM

[75] Inventors: Akira Miyake, Kyoto; Masaya Funahashi, Osaka, both of Japan

[73] Assignee: Hitachi Maxell, Ltd., Osaka, Japan

[21] Appl. No.: 776,695

[22] Filed: Sep. 16, 1985

[30] Foreign Application Priority Data

Sep. 18, 1984 [JP] Japan ................................. 59-195608
Feb. 8, 1985 [JP] Japan ................................. 60-24112

[51] Int. Cl.$^4$ ................................................. G11B 5/70
[52] U.S. Cl. .................................. 428/323; 252/62.54; 427/128; 427/131; 428/328; 428/329; 428/694; 428/695; 428/900
[58] Field of Search ............... 428/694, 695, 900, 328, 428/329, 323; 427/131, 128; 252/62.54; 360/134–136

[56] References Cited

U.S. PATENT DOCUMENTS

| | | |
|---|---|---|
| 3,470,021 | 9/1969 | Hendricx ........................... 252/62.54 |
| 3,547,693 | 12/1970 | Hugvenard ....................... 252/62.54 |
| 4,423,454 | 12/1983 | Felleisen ............................. 427/131 |
| 4,465,737 | 8/1984 | Miyatuka ............................. 428/339 |
| 4,522,885 | 6/1985 | Funahashi ........................... 428/695 |
| 4,579,778 | 4/1986 | Yamaguchi ......................... 428/694 |

FOREIGN PATENT DOCUMENTS 153533 11/1981 Japan ................................. 428/323

*Primary Examiner*—Ellis P. Robinson
*Attorney, Agent, or Firm*—Birch, Stewart, Kolasch & Birch

[57] ABSTRACT

A magnetic recording medium which comprises a substrate and a magnetic layer comprising a magnetic powder, a resinous binder, a lubricant and optionally a non-magnetic abrasive being formed on at least one surface of the substrate, characterized in that the lubricant comprises an ester of an unsaturated higher fatty acid with an alcohol having 6 to 16 carbon atoms, which has improved wear resistance in a wide temperature range.

9 Claims, No Drawings

MAGNETIC RECORDING MEDIUM

FIELD OF THE INVENTION

The present invention relates to a magnetic recording medium comprising a base substrate and a magnetic layer formed on at least one surface of the substrate and having improved lubricity and durability in a wide temperature range.

BACKGROUND OF THE INVENTION

In a magnetic recording medium such as a magnetic disc, a magnetic tape and a magnetic card prepared by applying a magnetic coating composition comprising magnetic powder, a resinous binder, an organic solvent and other necessary components onto a base substrate to make a magnetic layer, the magnetic layer is apt to be worn away due to its contact with a magnetic head or pad at a large velocity during recording and reproducing. Hitherto, wear resistance of the magnetic layer has been improved by the addition of a lubricant such as a higher fatty acid or its ester. Such conventional lubricants, however, have several drawbacks. For example, the lubricant with a high boiling point solidifies or becomes viscous at a low temperature so that it cannot produce the intended lubricating effect at that temperature. On the other hand, the lubricant with a low boiling point easily evaporates or has very low viscosity at a high temperature so that it exudes excessively on the surface of the magnetic layer due to sliding contact with the magnetic head and the like. Further, during storage of the magnetic recording medium, the lubricant is apt to exude on the the surface of the magnetic layer at a high temperature. Therefore, the conventional lubricant does not satisfactorily improve wear resistance of the magnetic layer in a wide service temperature range of from a low temperature to a high temperature.

SUMMARY OF THE INVENTION

One object of the present invention is to provide a magnetic recording medium with greatly improved wear resistance in a wide temperature range.

Another object of the present invention is to provide a magnetic recording medium comprising a magnetic layer containing a lubricant which can impart good lubricity to the surface of the magnetic layer at any temperature between a low temperature and a high temperature.

These and other objects are achieved by a magnetic recording medium which comprises a substrate and a magnetic layer comprising a magnetic powder, a resinous binder, a lubricant and optionally a non-magnetic abrasive being formed on at least one surface of the substrate, characterized in that the lubricant comprises an ester of an unsaturated higher fatty acid with an alcohol having from 6 to 16 carbon atoms.

Since the unsaturated higher fatty acid includes at least one carbon-carbon double bond in a molecule, its ester generally has a low cloud point so that the ester does not solidify at a low temperature. In addition, since the ester contains the alcohol having from 6 to 16 carbon atoms as the alcoholic moiety, it has a high boiling point so that it has low volatility at a high temperature and sufficient viscosity at a low temperature. That is, the lubricant used according to the present invention has, on the one hand, a high boiling point and low volatility as well as the desired viscosity at a low temperature and, on the other hand, a low cloud point. Therefore, the magnetic layer containing the lubricant according to the present invention has not only good surface lubricity and improved wear resistance at any service temperature between a low temperature and a high temperature but also good storability at a high temperature.

DETAILED DISCUSSION

The unsaturated higher fatty acid contains at least one carbon-carbon double bond in a molecule. Preferably, it has at least 14 carbon atoms.

The alcohol may be a straight or branched one. Usually, it has at least 6 carbon atoms, preferably 8 carbon atoms. When it has less than 6 carbon atoms, its ester does not have a sufficiently high boiling point and necessary viscosity at a low temperature.

Specific examples of the ester are 2-ethylhexyl ester, n-octyl ester, 2-ethylhexylcellosolve ester, butylcellosolve ester and isocetyl ester of a unsaturated higher fatty acid, particularly oleic acid.

The amount of the lubricant to be contained in the magnetic layer is 1 to 30 parts by weight, preferably 2 to 25 parts by weight, more preferably 8 to 15 parts by weight based on 100 parts by weight of the magnetic powder in the magnetic layer. When the amount of the lubricant is less than the above lower limit, wear resistance of the magnetic layer is not sufficiently improved. When it is too large, the lubricant exudes on the the surface of the magnetic layer and stains the magnetic head and the like.

The magnetic recording medium may be produced as follows:

A magnetic coating composition comprising the magnetic powder, the resinous binder, the lubricant and a suitable solvent (e.g., toluene, xylene, methyl ethyl ketone, methyl isobutyl ketone and cyclohexanone) is applied on one or both surfaces of a base substrate made of, for example, a polyester film, and dried to form the magnetic layer. After treating the surface of the magnetic layer by a per se conventional method such as calendering, the substrate with the magnetic layer is slit or blanked to produce a magnetic recording medium. The magnetic layer containing the lubricant may be formed by applying a coating composition comprising the magnetic powder, the resinous binder and the solvent on the substrate and drying it. Then, the substrate with the magnetic layer not containing the lubricant is coated with or dipped in a solution of the lubricant in a solvent (e.g., toluene, xylene and isopropanol) so as to impregnate the magnetic layer with the lubricant.

In the present invention, a conventional lubricant may be used together with the lubricant of the present invention. Specific examples of the conventional lubricant are organic ones such as higher fatty acids and their esters, hydrocarbons and polyethers and inorganic ones such as silicone oils and fluorine-containing oils.

The magnetic powder contained in the magnetic layer is any of the conventionally used oner and includes oxide type magnetic powder such as $\gamma$-$Fe_2O_3$, $Fe_3O_4$, an intermediate iron oxide of $\gamma$-$Fe_2O_3$ and $Fe_3O_4$, cobalt containing $\gamma$-$Fe_2O_3$ and $Fe_3O_4$, barium ferrite, $CrO_2$ and metal or alloy magnetic powder such as iron powder.

Specific examples of the resinous binder are vinyl chloride/vinyl acetate copolymers, cellulose type resins, polyvinyl butyral resins, polyurethane resins, polyester resins, epoxy resins, polyether resins, isocyanate compounds and the like.

The magnetic layer may further contain other additives such as a surfactant, a dispersant, an antistatic agent, a abrasive and a pigment.

To further improve wear resistance of the magnetic layer, as the abrasive, inorganic powder with Mohs hardness of at least 7 is preferably added to the magnetic layer. Among such abrasive, $\alpha\text{-}Al_2O_3$ powder, $Cr_2O_3$ powder and SiC powder are preferred. Particle size of the abrasive is usually from 0.1 to 2.0 $\mu$m.

When such the abrasive is used, its amount is 1 to 30 parts by weight, preferably 1 to 20 parts by weight based on 100 parts by weight of the magnetic powder contained in the magnetic layer. When too much abrasive is added, the residual magnetic flux density of the magnetic layer is decreased.

PREFERRED EMBODIMENTS

Practical and presently preferred embodiments of the invention are illustrated by the following examples wherein parts and percentages are by weight unless otherwise indicated.

Examples 1-20

For preparation of a magnetic coating composition, the components are used according to the following composition:

| Composition | Parts |
| --- | --- |
| Magnetic powder | 100 |
| Resinous binder A | (w) |
| Resinous binder B | (x) |
| Hardner (Tri-functional low molecular weight isocyanate compound) | 8 |
| Lubricant | (y) |
| Abrasive | (z) |
| Cyclohexanone | 150 |
| Toluene | 150 |

Note
w, x, y and z parts are shown in the Table.

All the components were well dispersed in a 3 liter ball mill for 96 hours to prepare a coating composition. The prepared composition was applied on both surfaces of a polyester base film with a thickness of 75 $\mu$m to form a magnetic layer with a thickness (t $\mu$m) shown in the Table, after drying, on each surface followed by calendering. The film having the magnetic layers on both surfaces was blanked in the form of a disc to produce a magnetic disc.

Each of the magnetic discs prepared in Examples 1-20 was tested as to its durability at a low temperature of 5° C. or a high temperature of 40°C. by measuring traveling time just after the production or after storing at 60° C. for 4 weeks.

The traveling time was measured by loading the magnetic disc on a recording-reproducing apparatus and traveling the disc while contacting it with a magnetic head under pad pressure of 30 g/cm² until the reproducing output is decreased to 70% of the initial output. The results are shown in the following Table.

TABLE

| Example No. | Magnetic powder | Binder A (w parts) | Binder B (x parts) | Lubricant (y parts) | Abrasive (z parts) (particle size, $\mu$m) | Magnetic layer thickness ($\mu$m) | Travelling Test (Hours) | | | |
| --- | --- | --- | --- | --- | --- | --- | --- | --- | --- | --- |
| | | | | | | | Initial | | After Storage | |
| | | | | | | | 5° C. | 40° C. | 5° C. | 40° C. |
| 1 | Co—containing $\gamma\text{-}Fe_2O_3$(*1) | Nitro-cellulose (19) | OH—containing(*2) polyurethane (12) | 2-Ethylhexyl oleate (10) | $\alpha\text{-}Al_2O_3$ (0.1) (0.4) | 1.1 | 180 | 210 | 190 | 215 |
| 2 | Co—containing $\gamma\text{-}Fe_2O_3$(*1) | Nitro-cellulose (19) | OH—containing(*2) polyurethane (12) | n-Octyl oleate (10) | $\alpha\text{-}Al_2O_3$ (0.1) (0.4) | 1.1 | 175 | 220 | 185 | 230 |
| 3 | Co—containing $\gamma\text{-}Fe_2O_3$(*1) | Nitro-cellulose (19) | OH—containing(*2) polyurethane (12) | n-Butyl oleate (10) | $\alpha\text{-}Al_2O_3$ (0.1) (0.4) | 1.1 | 190 | 110 | 70 | 60 |
| 4 | Co—containing $\gamma\text{-}Fe_2O_3$(*1) | Nitro-cellulose (19) | OH—containing(*2) polyurethane (12) | Stearyl stearate (10) | $\alpha\text{-}Al_2O_3$ (0.1) (0.4) | 1.1 | 40 | 180 | 50 | 190 |
| 5 | Co—containing $\gamma\text{-}Fe_2O_3$(*1) | Nitro-cellulose (19) | OH—containing(*2) polyurethane (12) | Butylcellosolve oleate (10) | $\alpha\text{-}Al_2O_3$ (0.1) (0.4) | 1.1 | 170 | 205 | 175 | 210 |
| 6 | Co—containing $\gamma\text{-}Fe_2O_3$(*1) | Nitro-cellulose (19) | OH—containing(*2) polyurethane (12) | 2-Ethylhexyl-cellosolve oleate (10) | $\alpha\text{-}Al_2O_3$ (0.1) (0.4) | 1.1 | 165 | 200 | 170 | 205 |
| 7 | Co—containing $\gamma\text{-}Fe_2O_3$(*1) | Nitro-cellulose (19) | OH—containing(*2) polyurethane (12) | 2-Ethylhexyl oleate (0.5) | $\alpha\text{-}Al_2O_3$ (0.1) (0.4) | 1.1 | 100 | 110 | 105 | 110 |
| 8 | Co—containing $\gamma\text{-}Fe_2O_3$(*1) | Nitro-cellulose (19) | OH—containing(*2) polyurethane (12) | 2-Ethylhexyl oleate (5) | $\alpha\text{-}Al_2O_3$ (0.1) (0.4) | 1.1 | 160 | 180 | 170 | 190 |
| 9 | Co—containing $\gamma\text{-}Fe_2O_3$(*1) | Nitro-cellulose (19) | OH—containing(*2) polyurethane (12) | 2-Ethylhexyl oleate (20) | $\alpha\text{-}Al_2O_3$ (0.1) (0.4) | 1.1 | 185 | 220 | 190 | 225 |
| 10 | Co—containing $\gamma\text{-}Fe_2O_3$(*1) | Nitro-cellulose (19) | OH—containing(*2) polyurethane (12) | 2-Ethylhexyl oleate (30) | $\alpha\text{-}Al_2O_3$ (0.1) (0.4) | 1.1 | 185 | 160 | 185 | 160 |
| 11 | Co—containing $\gamma\text{-}Fe_2O_3$(*1) | Nitro-cellulose (19) | OH—containing(*2) polyurethane (12) | 2-Ethylhexyl oleate (35) | $\alpha\text{-}Al_2O_3$ (0.1) (0.4) | 1.1 | 150 | 90 | 150 | 90 |
| 12 | Co—containing $\gamma\text{-}Fe_2O_3$(*1) | Nitro-cellulose (19) | OH—containing(*2) polyurethane (12) | 2-Ethylhexyl oleate (10) | $\alpha\text{-}Al_2O_3$ (10) (0.4) | 1.1 | 230 | 215 | 245 | 220 |

TABLE-continued

| Example No. | Magnetic powder | Binder A (w parts) | Binder B (x parts) | Lubricant (y parts) | Abrasive (z parts) (particle size, μm) | Magnetic layer thickness (μm) | Travelling Test (Hours) Initial 5° C. | Initial 40° C. | After Storage 5° C. | After Storage 40° C. |
|---|---|---|---|---|---|---|---|---|---|---|
| 13 | Co—containing $\gamma$-Fe$_2$O$_3$(*1) | Nitro-cellulose (19) | OH—containing(*2) polyurethane (12) | 2-Ethylhexyl oleate (10) | Cr$_2$O$_3$ (10) (0.4) | 1.1 | 215 | 215 | 230 | 220 |
| 14 | Co—containing $\gamma$-Fe$_2$O$_3$(*1) | Nitro-cellulose (19) | OH—containing(*2) polyurethane (12) | 2-Ethylhexyl oleate (10) | SiC (10) (0.4) | 1.1 | 220 | 210 | 235 | 215 |
| 15 | Co—containing $\gamma$-Fe$_2$O$_3$(*1) | Nitro-cellulose (19) | OH—containing(*2) polyurethane (12) | 2-Ethylhexyl oleate (10) | $\alpha$-Fe$_2$O$_3$ (10) (0.7) | 1.1 | 185 | 215 | 195 | 220 |
| 16 | $\alpha$-Fe(*3) | Vinyl chloride/vinyl acetate/vinyl alcohol copolymer (13.3) | OH—containing(*4) polyurethane (13.3) | 2-Ethylhexyl oleate (10) | $\alpha$-Al$_2$O$_3$ (6) (0.7) | 2.5 | 120 | 125 | 125 | 130 |
| 17 | $\alpha$-Fe(*3) | Vinyl chloride/vinyl acetate/vinyl alcohol copolymer (13.3) | OH—containing(*4) polyurethane (13.3) | 2-Ethylhexyl oleate (10) | Cr$_2$O$_3$ (6) (0.4) | 2.5 | 115 | 120 | 120 | 125 |
| 18 | $\alpha$-Fe(*3) | Vinyl chloride/vinyl acetate/vinyl alcohol copolymer (13.3) | OH—containing(*4) polyurethane (13.3) | 2-Ethylhexyl oleate (10) | SiC (6) (0.7) | 2.5 | 130 | 140 | 140 | 150 |
| 19 | $\alpha$-Fe(*3) | Vinyl chloride/vinyl acetate/vinyl alcohol copolymer (13.3) | OH—containing(*4) polyurethane (13.3) | n-Butyl stearate (10) | $\alpha$-Al$_2$O$_3$ (6) (0.7) | 2.5 | 115 | 115 | 120 | 40 |
| 20 | $\alpha$-Fe(*3) | Vinyl chloride/vinyl acetate/vinyl alcohol copolymer (13.3) | OH—containing(*4) polyurethane (13.3) | Stearyl oleate (10) | $\alpha$-Al$_2$O$_3$ (6) (0.7) | 2.5 | 20 | 130 | 25 | 135 |

Note
(*1)Coersive force-670 Oe, Saturation magnetization-79 emu/g, Specific surface area (BET)-17 m$^2$/g, Particle size-0.4 μm.
(*2)Molecular weight of 30,000.
(*3)Coersive force-1,650 Oe, Saturation magnetization-120 emu/g, Specific surface area (BET)-50 m$^2$/g, Particle size-0.25 μm.
(*2)Molecular weight of 20,000.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording disk which comprises a substrate having two surfaces and a magnetic layer comprising a magnetic powder, a resinous binder, a lubricant and optionally a non-magnetic abrasive formed on each of said surfaces of said substrate, characterized in that said lubricant consists essentially of an ester of an unsaturated higher fatty acid with an alcohol having from 6 to 16 carbon atoms in an amount of from 8 to 15 parts per 100 parts by weight of said magnetic powder.

2. A magnetic recording disk according to claim 1, wherein said unsaturated higher fatty acid has at least 14 carbon atoms.

3. A magnetic recording disk according to claim 1, wherein said alcohol has 8 to 16 carbon atoms.

4. A magnetic recording disk according to claim 1, wherein said unsaturated higher fatty acid is oleic acid.

5. A magnetic recording disk according to claim 1, wherein said ester is at least one selected from the group consisting of 2-ethylhexyl oleate and n-octyl oleate.

6. A magnetic recording disk according to claim 1, wherein the magnetic powder is at least one member selected from the group consisting of $\gamma$-Fe$_2$O$_3$, Fe$_3$O$_4$, an intermediate oxide form of $\gamma$-Fe$_2$O$_3$ and Fe$_3$O$_4$, cobalt-containing $\gamma$-Fe$_2$O$_3$ and Fe$_3$O$_4$, barium ferrite and CrO$_2$.

7. A magnetic recording disk according to claim 1, wherein said non-magnetic abrasive is an inorganic powder with a Mohs hardness of at least 7.

8. A magnetic recording disk according to claim 7, wherein the inorganic powder is at least one member selected from the group consisting of $\alpha$-Al$_2$O$_3$ powder, Cr$_2$O$_3$ powder and SiC powder.

9. A magnetic recording disk according to claim 7, wherein said inorganic powder has an average particle size of from 0.1 to 2.0 μm.

* * * * *